(No Model.)  2 Sheets—Sheet 1.
C. McGUIRE.
OSCILLATING GANG PLOW.
No. 435,513.  Patented Sept. 2, 1890.
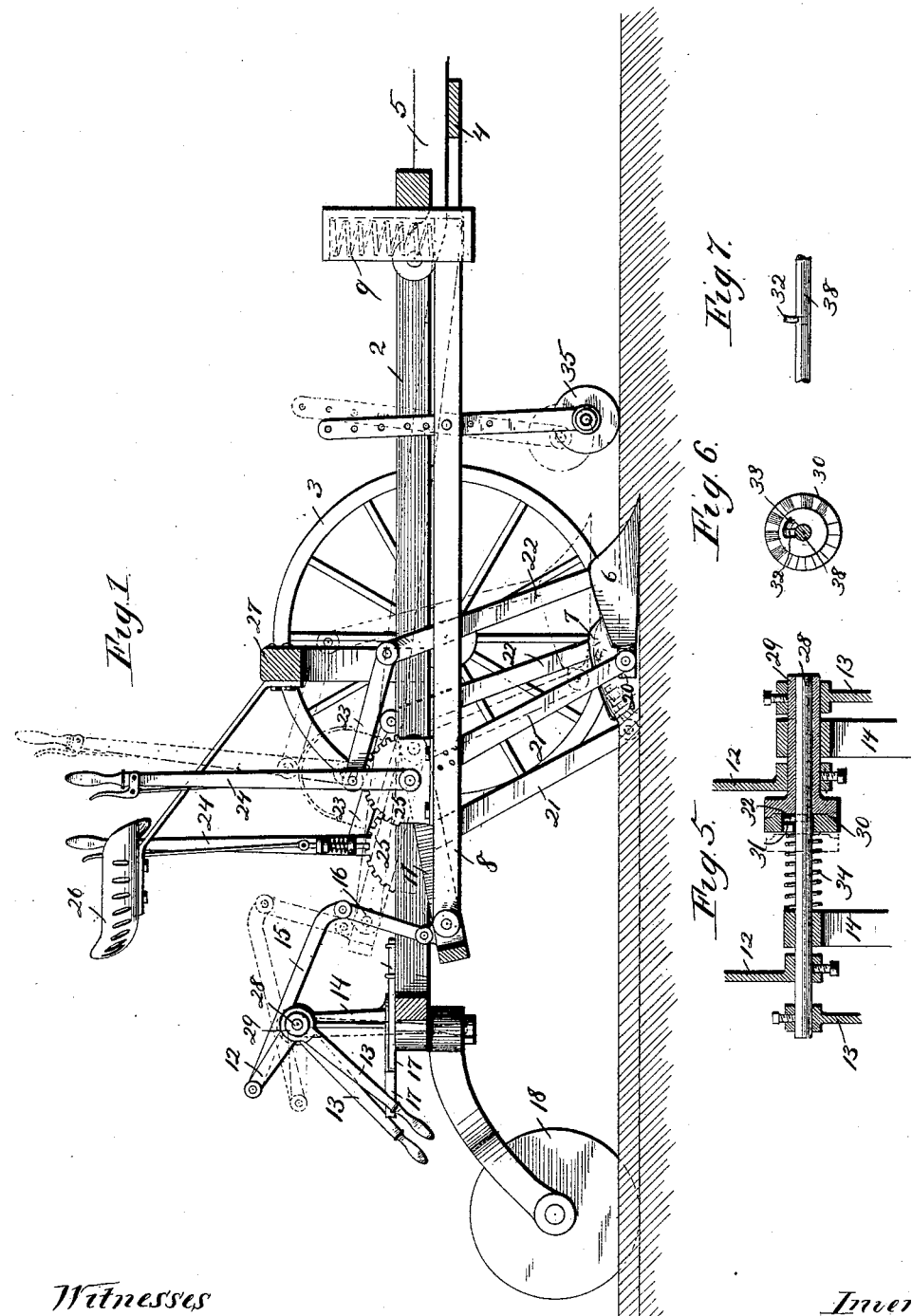
Witnesses
J. Jessen
Bessie Booth
Inventor.
Charles McGuire.
By Paul & Merwin Att'ys (No Model.) 2 Sheets—Sheet 2.
C. McGUIRE.
OSCILLATING GANG PLOW.
No. 435,513. Patented Sept. 2, 1890.
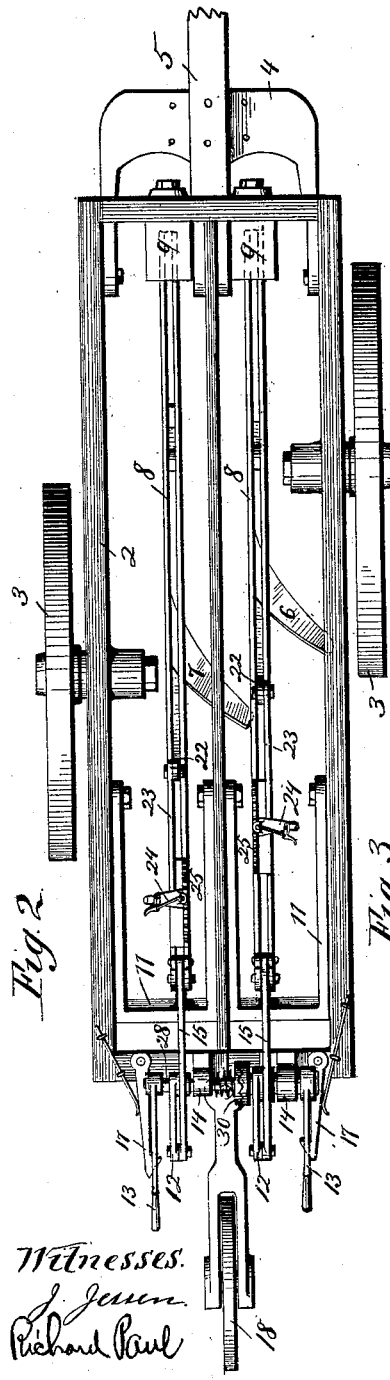
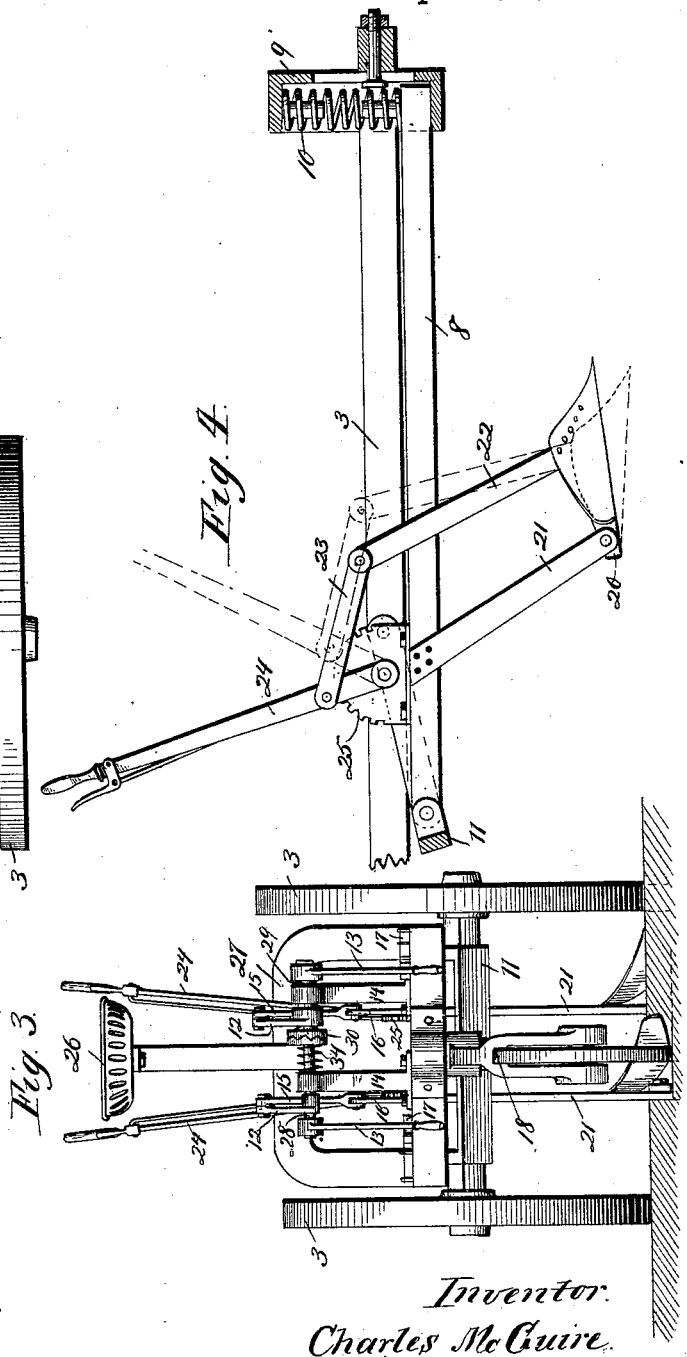
Inventor:
Charles McGuire.
By Paul & Menwin att'ys.
Witnesses.
J. Jenson
Richard Paul

UNITED STATES PATENT OFFICE.

CHARLES McGUIRE, OF GLASSTON, (DAKOTA TERRITORY,) NORTH DAKOTA.

OSCILLATING GANG-PLOW.

SPECIFICATION forming part of Letters Patent No. 435,513, dated September 2, 1890.

Application filed September 24, 1889. Serial No. 324,937. (No model.)

*To all whom it may concern:*

Be it known that I, CHARLES McGUIRE, of Glasston, in the county of Pembina and Territory of Dakota, have invented certain Improvements in Oscillating Gang-Plows, of which the following is a specification.

My invention relates to improvements in gang-plows having two or more independent plows, its object being to provide means whereby each plow can be controlled and raised and lowered independently of the others, so that at will a gang-plow may be changed to operate as a single sulky-plow, or vice versa; and it consists, generally, in the construction and combination hereinafter described, and particularly pointed out in the claims.

In gang-plows of the ordinary construction wherein the plows are rigidly connected together there is no independent control or action of the separate plows, but all are operated together, so that it is not practicable to turn a single furrow only, as is oftentimes desired, and if one plow meets with an obstruction so as to throw it from the furrow the others are also displaced.

With my improved oscillating plow each member or plow is operated and handled independently of the other, and when not in use can be thrown up so as to clear the ground, while allowing the others to operate. The position of each plow can also be independently changed while in operation, and the whole gang can be by a single motion raised several inches above the ground for the purpose of being transported from place to place by means of the carrying-wheels.

With my improved construction, also, the plow-points can each be raised or lowered without raising the plow to adapt it to different kinds of work, and the draft-connection for the plow being in the rear instead of the front the operation of raising the plows is assisted by the draft.

In the accompanying drawings, forming a part of this specification, Figure 1 is a side elevation of my improved plow, one wheel and the side of the frame being removed to show the arrangement of the parts. Fig. 2 is a plan view with the seat removed. Fig. 3 is a rear elevation of the same. Fig. 4 is a detail of one of the plows. Figs. 5, 6, and 7 are details of the clutch mechanism by means of which the whole gang is raised and lowered by operating one lever.

In the drawings, 2 represents a suitable rectangular frame supported on the ground-wheels 3.

4 is a clevis pivoted to the frame, to which the evener and whiffletrees are attached in any suitable manner.

5 is the pole, which is preferably adjustable laterally upon the frame to compensate for side drafts.

6 and 7, respectively, are the plows of the gang, which are arranged in the frame 2.

The plow-beams 8 are formed, preferably, of parallel flat steel bars secured together at a slight distance apart to admit of the movement between them of the plow-standards and standard of the gage-wheel, the forward end of the beam being arranged in suitable vertical guides 9, secured to the main frame, by means of which vertical play of the beam is allowed.

In order to control the position of the beam and yet allow it to yield to a strain or pressure from below, I prefer to arrange in each guide a coil-spring 10, bearing upon the top of the beam, and by its tension holding the beam in the bottom of the guide, but yielding elastically to allow the beam to rise in case the plow strikes an obstruction. The rear end of the plow is supported by means of the clevis or yoke 11, the arms of which are pivotally supported upon the end frame, the beam being pivotally secured between the arms of the clevis. The clevis is turned on its pivots, so as to raise or lower the plow by means of the lever 13, arranged upon the shaft 28, journaled in the standards 14, and having link-connection with the clevis, as by links 15 and 16 and arm 12.

In order to enable the operator to raise both plow-beams with one lever, I prefer to provide shaft-connection 28 between the levers, one lever being rigidly secured to this shaft and the other lever to a sleeve 29, arranged upon the shaft 28 and turning loosely upon it.

In order to lock the sleeve and shaft together, I provide the spring-controlled clutch 30, one member of which is formed on the sleeve and the other secured upon the shaft, so that when the members are in engagement with each other by operating either lever the shaft and sleeve are turned together and the plows raised accordingly.

To throw the clutch out of gear, the member carried upon the shaft is provided with a slot 31 to receive the pin 32 of the shaft, a shoulder 33 being arranged on one side of the slot, so that as the member of the clutch is pushed back against the tension of the spring 34 it may be turned through a slight angle to bring it into engagement with the shoulder, and thus hold the members of the clutch out of engagement. When in this position, each lever is operated independently to raise or lower its respective plow.

I prefer to provide suitable spring-catches 17 to lock the handles of the lever 13 when thrown downward, and to support the plows in their raised position. One of these catches is preferably made longer than the others, so as to engage its lever before the others are engaged, when the whole gang is raised and supported by means of this single lever, as described, while the other levers are not locked.

The hubs of the arms 12 serve as fulcrums for the links 15 to strike upon as the levers 13 are thrown downward, thus making the links themselves levers to lift the plows. The follower-wheel 18, pivotally supported to the rear of the frame and traveling in the last furrow, serves to carry the additional weight of the gang when raised.

The landside 20 of each plow is pivotally secured to its rear standard 22, which extends upward between the side bars of the plow-beam, above which it is connected by the link 23 to the pivoted lever 24, supported on the beam, by the throwing of which the plow-share point is raised or lowered without varying the position of the heel of the plow. A suitable quadrant 25 is preferably arranged in connection with said lever, by means of which the lever may be locked in the ordinary manner in any desired position. The seat 26 is supported upon a suitable arched standard 27 in suitable position for the rider to operate the levers.

While I have shown but two plows arranged in the gang, it is obvious that any number of plows may be arranged in the frame, each provided with the attachments above described.

In operation the right-hand wheel of the the machine is caused to travel in the last furrow, the plows being lowered to enter the ground by unhooking the levers 13 and adjusting by means of the levers 24 the proper position of the plow-point, and the depth of the furrow being determined by the adjustment of the gage-wheel 35. In case an obstacle is met by either plow, its being raised or thrown out of the furrow does not interfere with the action of the others, and the spring 10 allows vertical motion of each plow-beam. Either plow may be raised independently, as above described, and thus thrown out of operation, and when work is completed all the plows are raised by means of their levers 13, the levers 24 being also thrown back to raise the plow-points to any desired height. It is obvious that if a plow becomes clogged in the operation it may be thrown entirely out of the furrow without interfering with the operation of the other plows, or may be raised and cleaned and returned to the furrow without moving the others.

I claim as my invention—

1. In a gang-plow having a series of independent plows adapted to be raised and lowered by levers pivoted to the frame of the machine and connected, respectively, to said plows, the combination, with said levers, of means for locking the same together, comprising, in combination, a transverse shaft, to which one lever is rigidly secured, a sleeve loosely journaled upon said shaft and rigidly secured to another lever, a spring-controlled clutch arranged upon said shaft and adapted to lock said shaft and sleeve together, and means, substantially as described, for holding said clutch out of engagement with said sleeve, substantially as described.

2. In a device of the class described, having a suitable frame, the combination of a series of plows arranged in said frame, vertical guides receiving the forward ends of the plow-beams, springs arranged in said guides and bearing upon said beams, clevis or yoke supports for the rear ends of said beams, and means, substantially as described, for turning said clevises and raising or lowering the plow-beams, as and for the purpose set forth.

3. In a device of the class described, having a suitable frame and a series of plows arranged in said frame, of vertical guides receiving the forward ends of the plow-beams, having springs bearing upon the top of said beams, clevises having their arms pivoted to the main frame and carrying on suitable pivots the rear ends of said plow-beams, and bell-crank levers pivoted upon the frame and linked to said clevises, substantially as and for the purpose set forth.

4. In a gang-plow having a series of independent plows, the combination of the guides 9, having the springs 10, and adapted to receive, respectively, the forward ends of the plow-beams, clevises 11, having their arms pivoted to the frame of the plow and pivotally supporting the rear ends of the plow-beams, respectively, bell-crank levers 13, pivoted upon said frame and linked to said clevises, vertically-adjustable forward plow-standards, and pivoted levers 24, arranged upon the plow-beams and linked to said standards 22, substantially as and for the purposes set forth.

5. In a gang-plow, the combination, with each of the independent plow-beams, of the vertical guide 9, receiving its forward end, and the spring 10, arranged in said guide and bearing upon the top of said beam, substantially as and for the purposes set forth.

6. In a gang-plow having a series of independent plows, means for raising and lowering each of said plows, comprising a clevis or a yoke 11, having its arms pivoted to the frame of the plow, with its loop or body extended rearward and supporting upon a pivot the rear end of the plow-beam, and means for turning said clevis upon its pivots, so as to raise or lower at will said plow-beam, substantially as and for the purposes set forth.

In testimony whereof I have hereunto set my hand this 29th day of August, 1889.

CHARLES McGUIRE.

In presence of—
A. M. GASKILL,
T. D. MERWIN.